(12) United States Patent
    Johnston

(10) Patent No.: US 8,800,361 B1
(45) Date of Patent: Aug. 12, 2014

(54) ENVIRONMENT MONITOR

(71) Applicant: Campbell Scientific, Inc., Logan, UT (US)

(72) Inventor: John Royce Johnston, Smithfield, UT (US)

(73) Assignee: Campbell Scientific, Inc., Logan, UT (US)

( * ) Notice: Subject to any disclaimer, the term of this patent is extended or adjusted under 35 U.S.C. 154(b) by 0 days.

(21) Appl. No.: 13/903,617

(22) Filed: May 28, 2013

Related U.S. Application Data

(60) Provisional application No. 61/792,580, filed on Mar. 15, 2013, provisional application No. 61/792,725, filed on Mar. 15, 2013.

(51) Int. Cl.
    G01W 1/00    (2006.01)
(52) U.S. Cl.
    CPC ........................................ G01W 1/00 (2013.01)
    USPC ....................................................... 73/170.16
(58) Field of Classification Search
    USPC ........................................ 73/170.16–170.28
    See application file for complete search history.

(56) References Cited

U.S. PATENT DOCUMENTS

| | | | | |
|---|---|---|---|---|
| 4,218,755 | A  * | 8/1980 | Root | 702/3 |
| 7,114,388 | B1 * | 10/2006 | French et al. | 73/170.16 |
| 7,658,101 | B2 * | 2/2010 | Gotoh et al. | 73/170.17 |
| 8,100,004 | B2 * | 1/2012 | Young et al. | 73/170.16 |
| 2012/0234089 | A1 * | 9/2012 | Llinas Gonzalez et al. | 73/170.16 |
| 2014/0137644 | A1 * | 5/2014 | Root et al. | 73/170.16 |

* cited by examiner

*Primary Examiner* — Andre Allen
(74) *Attorney, Agent, or Firm* — Maschoff Brennan

(57) ABSTRACT

An environment monitor is described. In an example embodiment, an environment monitor includes an outer housing, an inner housing, and an environment sensor. The inner housing is slidingly positioned relative to the outer housing. The inner housing is configured to be selectively positioned at a first position relative to the outer housing and selectively positioned at a different second position relative to the outer housing. The environment sensor is configured to monitor a characteristic of an environment proximate the sensor. The sensor is positioned on the inner housing such that the environment sensor is at least partially positioned within the outer housing when the inner housing is at the first position relative to the outer housing, and is positioned outside the outer housing when the inner housing is at the second position relative to the outer housing.

20 Claims, 6 Drawing Sheets

ENVIRONMENT MONITOR

CROSS-REFERENCE TO RELATED APPLICATIONS

This application claims priority to U.S. Provisional Application No. 61/792,580, filed Mar. 15, 2013, titled ENVIRONMENT MONITOR, and also claims priority to U.S. Provisional Application No. 61/792,725, filed Mar. 15, 2013, titled ENVIRONMENT MONITORING SYSTEM, both of which are incorporated herein by reference in their entireties.

BACKGROUND

1. Field

The embodiments discussed herein relate to systems and devices for monitoring an environment.

2. Relevant Technology

Portable environment monitors may be used to monitor environment information related to an environment proximate the environment monitor. Although the functionality of different environment monitors may vary, some conventional environment monitors include sensors configured to monitor and/or calculate characteristics such as time, direction, wind speed, wind direction, wind chill, humidity, wet bulb, dew point, comfort index, delta temperature, barometric pressure, altitude, and/or density altitude.

The information provided by environment monitors may prove useful in a number of common situations. For example, environment monitors may be employed for weather monitoring in professional, amateur, and/or educational settings. Furthermore, environment monitors may be employed in aviation and air sports such as hot-air ballooning, hang gliding, and the like. Environment monitors may also be used in scenarios relating to ballistics use, including hunting, military operations, and the like. Other scenarios may include, but are not limited to, sailing and other water-based sports, construction, agriculture, land-based racing, and numerous hobbies.

Conventionally, environment monitors often include a case to protect the element monitor and its sensors from damage, dust, and the like. Some conventional environment monitors include cases that are entirely separated from the portion of the environment monitor including the sensors before the environment monitor is used. Other environment monitors include cases that rotate away from the environment sensors while remaining attached to the portion of the environment monitor enclosing the sensors.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Embodiments relate to systems and devices for monitoring an environment.

This Summary introduces a selection of concepts in a simplified form that are further described below in the Detailed Description. This Summary is not intended to identify key features or essential characteristics of the claimed subject matter, nor is it intended to be used as an aid in determining the scope of the claimed subject matter.

In an example embodiment, an environment monitor includes an outer housing, an inner housing, and an environment sensor. The inner housing is slidingly positioned relative the outer housing. The inner housing is configured to be selectively positioned at a first position relative to the outer housing and selectively positioned at a different second position relative to the outer housing. The environment sensor is configured to monitor a characteristic of an environment proximate the sensor. The sensor is positioned on the inner housing such that the environment sensor is at least partially positioned within the outer housing when the inner housing is at the first position relative to the outer housing, and is positioned outside the outer housing when the inner housing is at the second position relative to the outer housing.

In another example embodiment, an environment monitor includes an outer housing, an inner housing, and multiple environment sensors. The inner housing is positioned at least partially within the outer housing. The multiple environment sensors are positioned within the inner housing. The multiple environment sensors are configured to monitor the environment proximate the multiple environment sensors when the environment sensors are positioned outside the outer housing. The inner housing is slidingly movable between a first position and a second position, both relative to the outer housing. The inner housing and the outer housing are configured such that the multiple environment sensors are positioned within the outer housing when the inner housing is located in the first position relative to the outer housing, and the multiple environment sensors are positioned outside the outer housing when the inner housing is located in the second position relative to the outer housing.

In yet another example embodiment, a device for monitoring an environment proximate the device includes an outer housing, an inner housing, multiple environment sensors positioned on the inner housing, and an antenna configured to form a wireless interface with a mobile device. The inner housing includes a protrusion extending outside of the outer housing. The multiple environment sensors are configured to monitor the environment proximate the plurality of environment sensors when the environment sensors are positioned outside the outer housing. The antenna is configured to transmit environment data from the multiple environment sensors to the mobile device. The inner housing is configured to interface with the outer housing such that the inner housing is slidingly movable between a first position and a second position relative to the outer housing by way of a force applied to the protrusion relative to the outer housing. The inner housing and the outer housing are configured such that the multiple environment sensors are positioned within the outer housing when the inner housing is located in the first position relative to the outer housing, and the multiple environment sensors are positioned outside the outer housing when the inner housing is located in the second position relative to the outer housing.

Additional features and advantages will be set forth in the description which follows, and in part will be obvious from the description, or may be learned by the practice of the embodiments. The features and advantages of the embodiments will be realized and obtained by means of the instruments and combinations particularly pointed out in the claims. These and other features will become more fully apparent from the following description and claims, or may be learned by the practice of the embodiments as set forth hereinafter.

BRIEF DESCRIPTION OF THE DRAWINGS

Embodiments will be described and explained with additional specificity and detail through the use of the accompanying drawings in which.

DESCRIPTION OF EMBODIMENTS

Figure 1A:
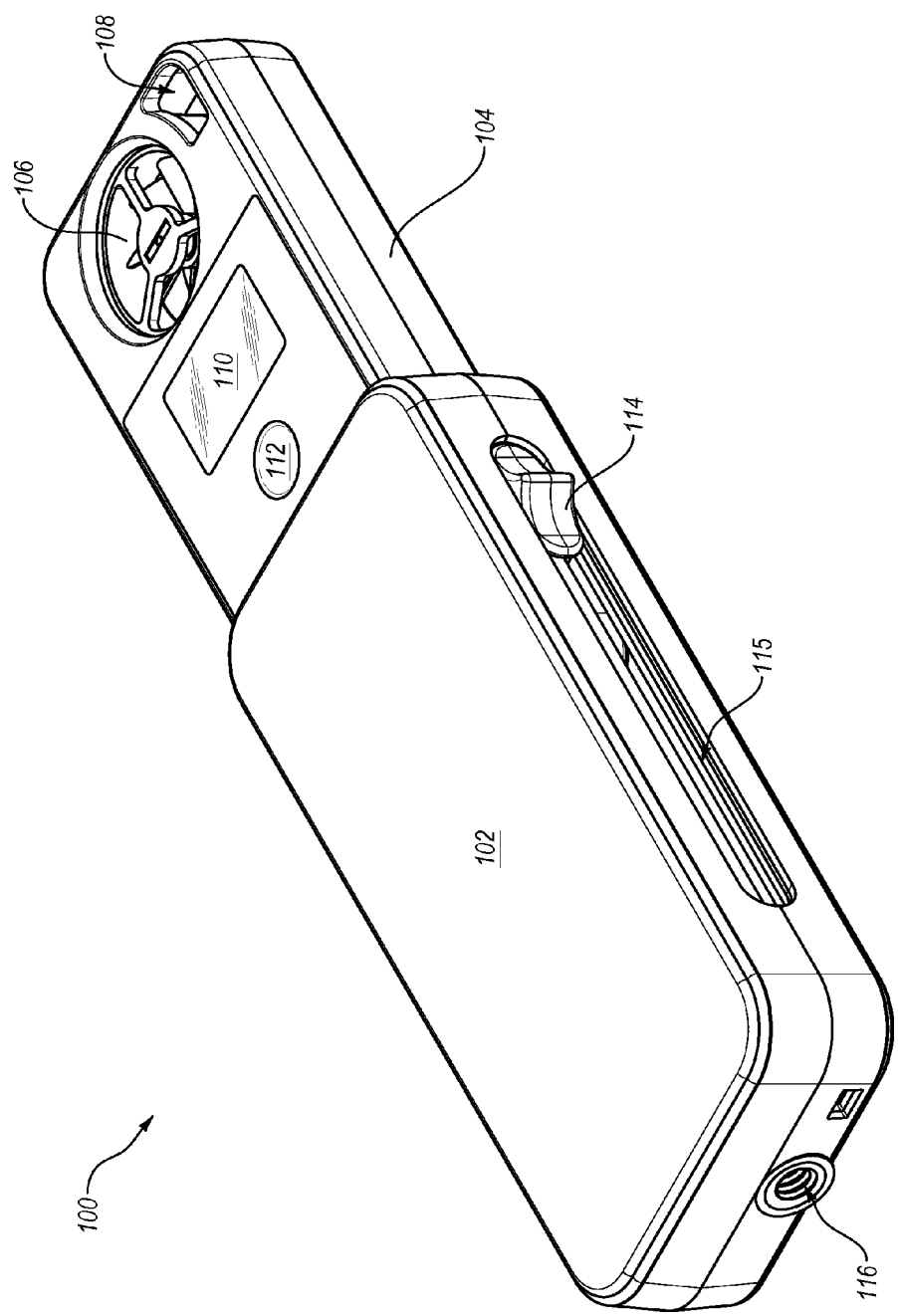
FIG. 1A is a front perspective view of an example environment monitor in an open configuration.

Conventional environment monitors that do not include a case or include a case that is removed entirely prior to using the environment monitor may cause a temperature sensor in the environment monitor to detect an incorrect temperature when held in a user's hand. The heat from the user's hand may cause the temperature sensor to return a temperature generally higher than the actual temperature of the environment. The degree of temperature error experienced may gradually increase the longer the user holds the environment monitor.

Many conventional environment monitors may display current results from the sensors exclusively on a display located on the environment monitor. In some instances, the act of holding the environment monitor in a position that allows a user to read the display may cause the sensors to report inaccurate information. For example, if a user holds the environment monitor in a position where the user's body alters the wind detected by a wind sensor, wind speed and/or wind direction information collected by the environment sensor may be incorrect. Similarly, any information derived from the wind speed and/or wind direction may be incorrect.

Furthermore, conventional environment monitor cases generally require two hands to move and/or remove the case. In some situations, using two hands to move or remove the case may be impossible, difficult, unsafe, and/or inconvenient for the user of the environment monitor.

Some conventional environment monitors may include cases that rotate away from the portion of the environment monitor including the various sensors. While some such cases may improve the temperature accuracy of the environment monitor when the environment monitor is held by its case, the case may cause the environment monitor to take an asymmetrical shape when the environment monitor is attached to a holding device such as a tripod. As a result of the asymmetrical shape, the environment monitor may experience a moment from wind and the accuracy of the environment monitor may be affected.

Embodiments of the invention relate to systems and devices for monitoring an environment. Some embodiments disclose an environment monitor that advantageously allows a user to open and close the environment monitor using one hand. The environment monitor may include an outer housing that thermally isolates the sensors from the heat of a user holding the environment monitor.

In some embodiments, the environment monitor is configured to form a wireless interface with a mobile device. The mobile device may display the sensor information from the environment monitor on a display of the mobile device. Advantageously, the environment monitor may be positioned such that the user's body does not affect the information determined by the sensors, but may still allow a user to conveniently monitor the data provided by the environment monitor.

In some embodiments, the environment monitor may form a part of the environment monitoring system. The environment monitoring system may include the mobile device. The mobile device may include an application configured to process the sensor information according to a particular situation and/or activity. Advantageously, the monitoring system may permit a particular environment monitor to be used in a number of situations and/or activities merely by changing the application used on the mobile device. Furthermore, the application may be customized to reflect parameters of a user's particular situation, activity, or utility. In contrast, a conventional environment monitor may be suited for only a subset of particular situations and/or activities, or may be configured for a generic set of parameters.

The mobile device may conventionally include environment sensors. For example, many mobile phones described as "smart-phones" may include global positioning system (GPS) sensors or other positioning sensors, ambient light sensors, compasses, motion sensors, and the like. In some embodiments, the environment sensors in the mobile device may advantageously be used to enhance the environment monitor and/or reduce the environment sensors included in the environment monitor. In some embodiments, environment sensors native to the mobile device may be eliminated from the environment sensor, advantageously allowing a less expensive environment sensor to maintain the same functionality when used with the mobile device.

Reference will now be made to the figures wherein like structures will be provided with like reference designations. The drawings are diagrammatic and schematic representations of exemplary embodiments and, accordingly, are not limiting of the scope of the claimed subject matter, nor are the drawings necessarily drawn to scale.

Figure 1B:
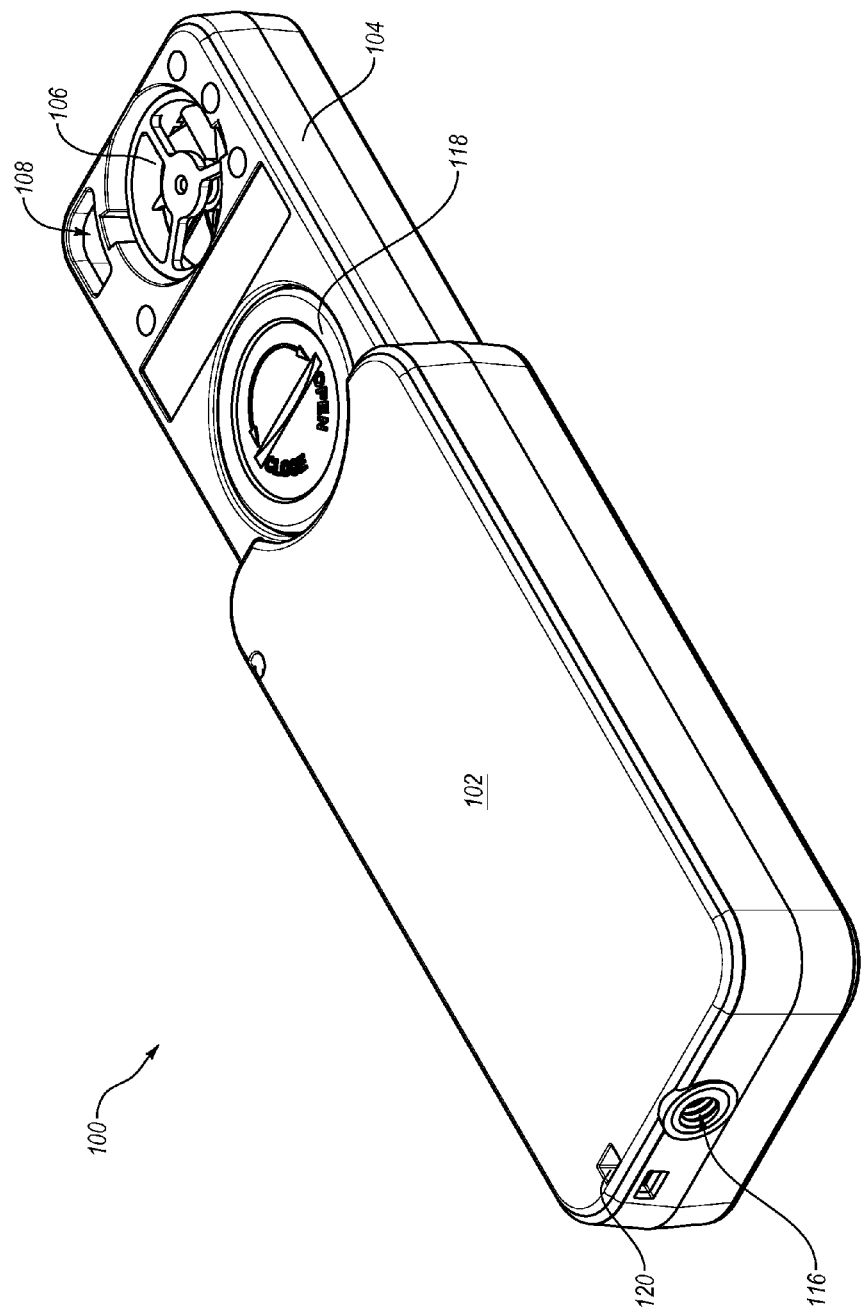
FIG. 1B is a rear perspective view of the example environment monitor of FIG. 1A in the open configuration.
Figure 1C:
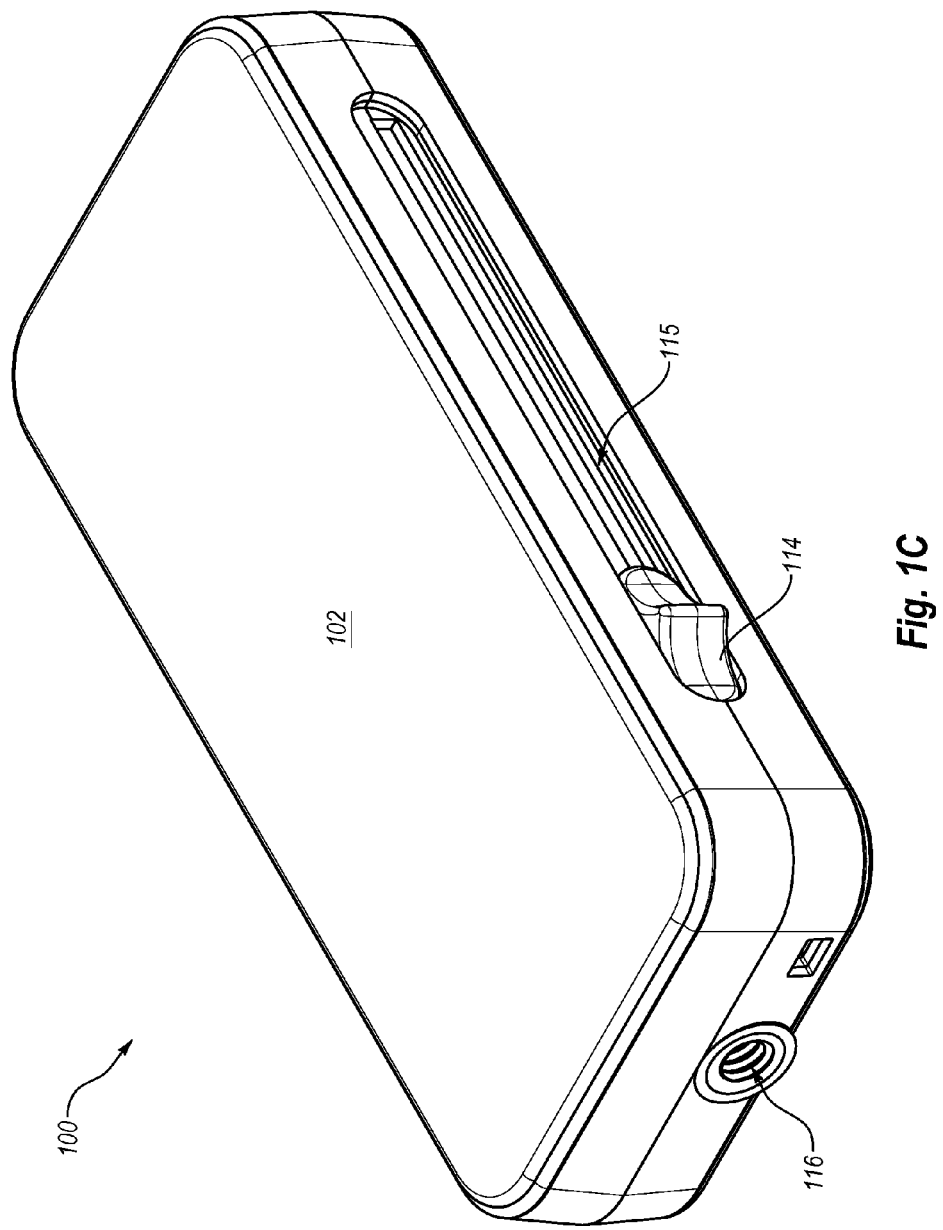
FIG. 1C is a front perspective view of the example environment monitor of FIG. 1A in a closed configuration.
Figure 1D:
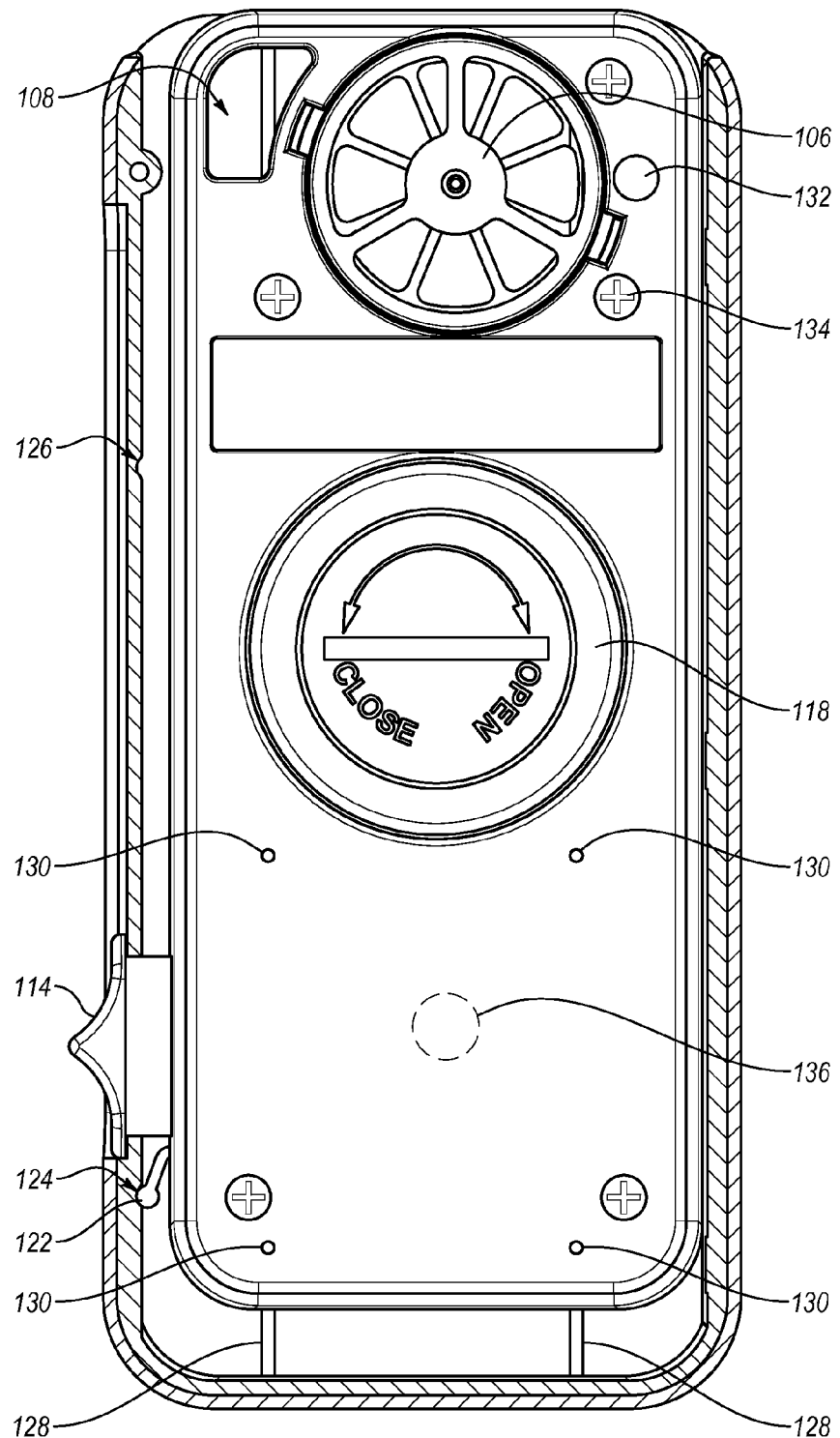
FIG. 1D is a rear cutaway view of the example environment monitor of FIG. 1A in the closed configuration.

FIGS. 1A-1D are various views of an example monitor 100. FIGS. 1A and 1B are front perspective and rear perspective views, respectively, of the monitor 100 in an open configuration. FIG. 1C is a front perspective view of the monitor 100 in a closed configuration. FIG. 1D is a rear cutaway view of the monitor 100 in the closed configuration. The monitor 100 includes an outer housing 102 and an inner housing 104.

In the open configuration, at least a portion of the inner housing 104 is located outside of the outer housing 102 as generally shown in FIGS. 1A and 1B. In the closed configuration, the inner housing 104 is largely located inside the outer housing 102 as generally shown in FIGS. 1C and 1D. A portion of the inner housing 104 may remain outside the outer housing 102 when the monitor 100 is in the closed configuration.

The inner housing 104 may include one or more environment sensors for determining one or more characteristics of the environment proximate the sensors. The environment sensors may include a wind sensor 106 located within the inner housing 104. Other environment sensors (not shown) may include, but are not limited to, a dry bulb temperature sensor, a wet bulb temperature sensor, a compass, a wind vane, a humidity sensor, a barometric pressure sensor, and/or an altitude sensor, or the like. The other environment sensors may be located within the inner housing 104. For example, in some embodiments, the other environment sensors may be located within a sensor opening 108.

The environment sensors such as the wind sensor 106 may be positioned within the inner housing 104 such that the environment sensors are located within the outer housing 102 when the monitor 100 is in the closed configuration. The environment sensors such as the wind sensor 106 may also be positioned such that the environment sensors are located outside the outer housing 102 when the monitor 100 is in the open configuration.

In some embodiments, the environment sensors may include a temperature sensor. The configuration of the outer housing 102 and the inner housing 104 may act to thermally isolate the temperature sensor from heat generated by a user's hand holding the outer housing 102. For example, the outer housing 102 may include materials with a low thermal conductivity and/or the contact between the outer housing 102 and the inner housing 104 may be minimized to reduce the heat transferred from the outer housing 102 to the inner housing 104.

The monitor 100 may be configured to derive related measurements from the sensed characteristics of the environment. For example, the monitor 100 may be configured to derive a wind chill, a dew point temperature, a delta temperature, a comfort index, an altitude, and/or a density altitude, or other derivable measurements.

The inner housing 104 may include a display 110 for displaying sensed and/or derived characteristics of the surrounding environment. The inner housing 104 may also include a button 112 for turning the monitor 100 on and/or off, changing the information displayed on the display 110, changing the settings of the monitor 100, and/or causing the monitor 100 to wirelessly connect to a mobile device as described herein.

The inner housing 104 may include a protrusion 114. The protrusion 114 may be located at least partially outside of the outer housing 102. The protrusion 114 may extend beyond the outer housing 102 through a protrusion opening 115 shaped to allow the protrusion 114 to move between the open and closed configurations. The protrusion 114 may be ergonomically shaped with curvatures adapted to receive a thumb for opening and closing, which can include a top ergonomic curve for closing and a bottom ergonomic curve for opening. A top ridge can separate the top and bottom ergonomic curves. The ergonomic curves can be a distance from the outer housing so that operation thereof can be done without the thumb touching the outer housing. The protrusion 114 and/or protrusion opening 115 can be ratcheted with select ratchet spacing so that the opening and closing can select the ratcheted position for the inner housing 104 to be relatively positioned with respect to the outer housing 102.

The protrusion 114 is positioned to allow a user to open and/or close the monitor 100 using one hand. For example, a user may hold the closed monitor 100 in one hand and may urge the protrusion 114 toward the open configuration using a thumb of the same hand. Also, the configuration of the outer housing 102 and protrusion 114 can allow for the outer housing 102 to rest against a palm with three fingers on a side opposite of the protrusion 114 and a pinky finger on a bottom side between the opposite side and protrusion side such that the thumb can flick the protrusion 114 along the protrusion opening 115 for opening and closing motions.

In some embodiments, the monitor 100 may include an a position sensor 136 that causes the monitor 100 to turn on when the monitor 100 is moved to the open configuration and off when the monitor 100 is moved to the closed configuration. The position sensor 136 may be a magnetic switch, a physical switch, or the like. The outer housing 102 may include a feature such as a magnet (not shown) for triggering the position sensor 136 such that the monitor 100 is turned on and off.

The outer housing 102 may include a threaded connector 116 configured to allow the monitor 100 to be secured to another suitable threaded connector (not shown). In some embodiments, the threaded connector 116 may be a female threaded connector sized to connect to a standard size male threaded connector. The threaded connector 116 may be sized to connect to male threaded connectors commonly provided on tripods and the like. In some instances, the threaded connector 116 may be connected to a wind vane such that the monitor 100 moves to a position in-line with the direction of the wind. The female threaded connector 116 can be configured to mount to a standard male threaded connector of a camera support device, such as a camera tripod. Accordingly, a kit of the invention can include the monitor 100 and a camera support device having the male threaded connector.

The inner housing 104 may include a battery (not shown) and a battery cover 118 for accessing the battery. The inner housing 104 may also include fasteners 134 for assembling the inner housing 104. In some embodiments, the inner housing 104 may include a cover 132 configured to cover a mechanism allowing the wind sensor 106 to be replaced.

Referring to FIG. 1D, the inner housing 104 may be slidingly positioned relative to the outer housing 102. In some embodiments, the inner housing 104 may include protrusions 130. The protrusions 130 may be located on the front (not shown) and back of the inner housing 104. The protrusions 130 may be sized and shaped to fit within tracks 128 formed on the outer housing 102. The tracks 128 may be positioned opposite and proximate the protrusions 130. The tracks 128 may be shaped such that the protrusions 130 slide within the tracks 128 and the inner housing 104 travels between an open position and a closed position relative to the outer housing 102 when a suitable force is applied to the protrusion 114 and/or inner housing 104 relative to the outer housing 102.

The monitor 100 may include a detent or the like. The detent may be configured to encourage the monitor 100 to stay in the open and/or closed configuration until purposefully moved by a user. In some embodiments, the inner housing 104 may include a detent spring 122. The outer housing 102 may include a detent indentation 124 positioned to receive at least a portion of the detent spring 122 when the monitor 100 is in the closed configuration. Similarly, the outer housing 102 may include a detent indentation 126 positioned to at least partially receive the detent spring 122 when the monitor 100 is in the open configuration. The detent indentation 124 and the detent indentation 126 may act to retain the detent spring 122 at the open or closed configuration until a suitable force is applied to overcome the retaining bias.

Figure 2:
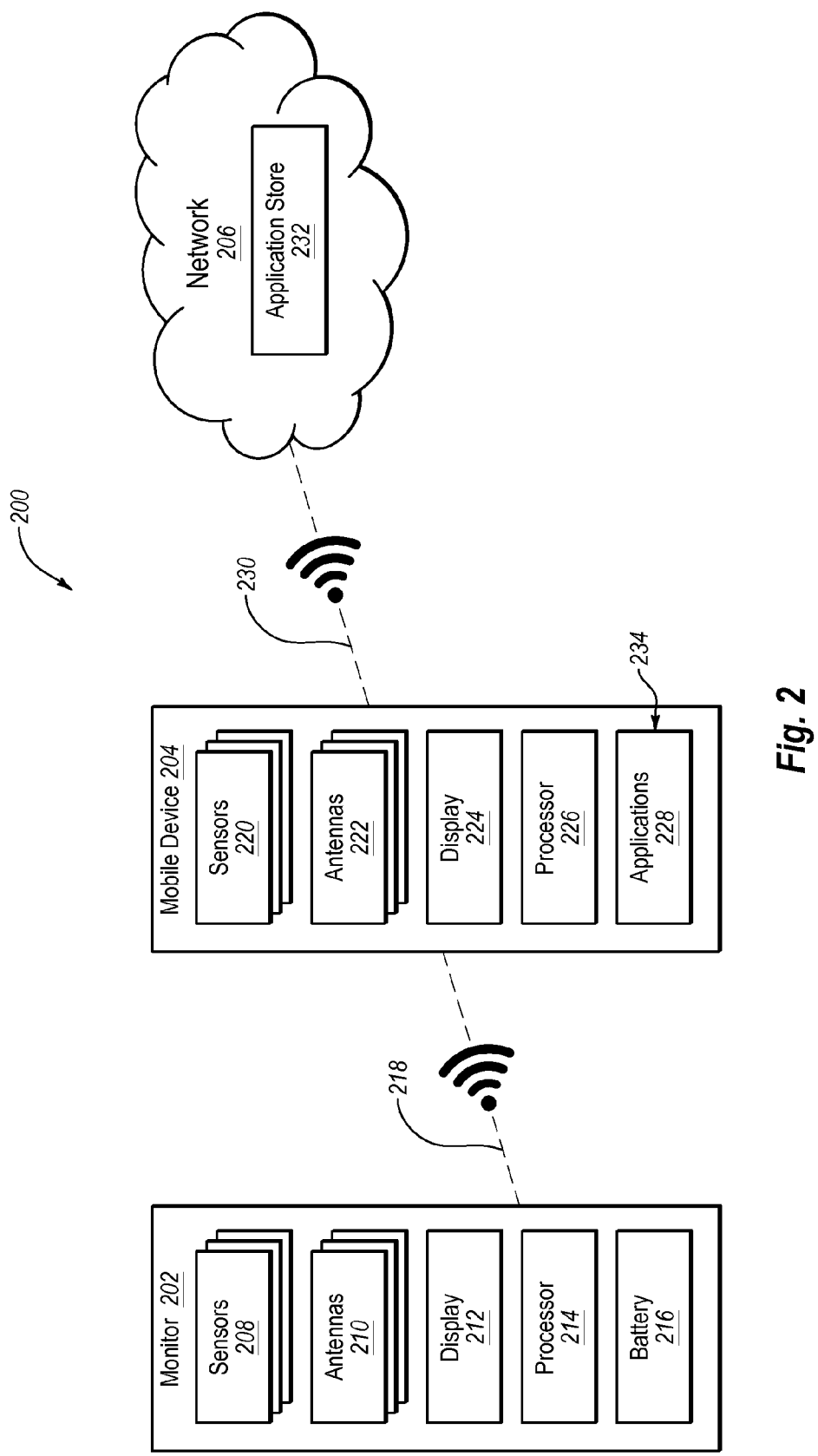
FIG. 2 is a diagrammatic depiction of an environment monitoring system that may include the example environment monitor of FIG. 1A.

FIG. 2 is a diagrammatic depiction of an environment monitoring system 200. The system 200 may include a monitor 202 generally corresponding to the monitor 100 of FIGS. 1A-1D. The system 200 may further include a mobile device 204 generally corresponding to the mobile device described with reference to FIGS. 1A-1D.

The monitor 202 may include sensors 208 generally corresponding to the environmental sensors such as the wind sensor 106 described with reference to FIGS. 1A-1D. Other sensors 208 may include a dry bulb temperature sensor, a wet bulb temperature sensor, a compass, a wind vane, a humidity sensor, a barometric pressure sensor, and/or an altitude sensor, or the like.

The monitor 202 may further include antennas 210. The antennas 210 may be configured to form a wireless interface 218. The antennas 210 may be configured to form a Bluetooth interface, an IEEE 802.11 interface, or a similar wireless communication interface. The monitor 202 may include a display 212 and battery 216 generally corresponding to the display 110 and battery, respectively, described with reference to FIGS. 1A-1D.

The monitor 202 may also include a processor 214. The processor 214 may generally control the functions of the monitor 202, including deriving measurements from the sensed environmental characteristics sensed by the sensors 208. For example, the processor 214 may derive a wind chill, a dew point temperature, a delta temperature, a comfort index, an altitude, and/or a density altitude, or other derivable measurements. The processor 214 may further cause the monitor 202 to form the wireless interface 218 and to communicate via the wireless interface 218. While not shown, the monitor 202 may include one or more of the features or components of the mobile device 204, such as accelerometers, gyroscopes, magnetometers, ambient light sensors, GPS sensors or other location sensors, cameras, microphones, and the like.

The mobile device 204 may include virtually any communication-enabled mobile device including, but not limited to, a portable media device, a personal digital assistant (PDA), a smartphone, a tablet computer, a laptop computer, or other communication-enabled mobile device. The mobile device 204 may also include sensors 220. The sensors 220 may include accelerometers, gyroscopes, magnetometers, ambient light sensors, GPS sensors or other location sensors, cameras, microphones, and the like. Some of the sensors 220 may sense information about an environment proximate the mobile device 204, such as ambient light sensors, GPS sensors, cameras, and the like.

The mobile device 204 may also include antennas 222. The antennas 222 may be configured to form an IEEE 802.11 interface, a Bluetooth interface, a Universal Mobile Telecommunications System (UMTS) interface, a Long Term Evolution Advanced (LTE-A) interface, other mobile cellular interface, or other wireless communication interface. The antennas 222 may be configured to form the wireless interface 218 with the monitor 202. The antennas 222 may further be configured to form a wireless interface 230 with a network 206.

The mobile device 204 may include a display 224. The mobile device 204 also includes a processor 226. The processor 226 may generally control the functions of the mobile device 204, including causing the monitor 202 to form the wireless interface 218 or the wireless interface 230 and to communicate via the wireless interface 218 or the wireless interface 230. The processor 226 may also be configured to execute applications 228 that may cause the mobile device 204 to communicate with the monitor 202, calculate information, perform actions such as retrieving information from the network 206, and/or display information and images on the display 224 and/or the display 212. The applications 228 may be stored on a storage 234, or located in a memory of the mobile device 204.

The mobile device 204 may download various applications 228 from an application store 232 available via the network 206. For example, the application store 232 may include an online application store for a particular mobile device manufacturer and/or mobile device operating system.

Applications 228 that allow the mobile device 204 to be used with, enhance, and/or specialize the functionality of the monitor 202 may be distributed through the application store 232. The applications 228 may generally allow the mobile device 204 to receive environmental information gathered by the sensors 208 and/or derived by the monitor 202. The mobile device 204 may determine additional environmental information from the sensors 220.

The mobile device 204 may consider the environmental information from the monitor 202 and/or sensors 220 according to an application 228 executed by the processor 226. The environmental information and/or other information based on the environmental information may be provided to the user of the mobile device 204 via the display 224, speakers (not shown), a headset (not shown), or the like. The environmental information and/or other information based on the environmental information may be provided to the user in real-time or near real-time. In some embodiments, the applications may alternately or additionally cause the information to be displayed at the display 212 via the wireless interface 218.

The applications 228 may be designed according to an objective. For example, the applications 228 may be designed for use in a particular activity, situation, and/or utility. For example, applications 228 may be designed for weather monitoring in professional, amateur, and/or educational settings. Furthermore, applications 228 may be designed for use in aviation and air sports such as hot-air ballooning, hang gliding, and the like. Applications 228 may also be designed for use in scenarios relating to ballistics use, including hunting, target shooting, military operations, and the like. In some embodiments, applications 228 may also be designed for use in sailing and other water-based sports, construction, agriculture, land-based racing, and numerous hobbies.

The applications 228 may allow a single type of environment monitor, such as the monitor 100, to be used in a variety of activities, situations, and utilities. Advantageously, environment monitor manufacturers may design, manufacture, and sell fewer specialized environment monitors, as the specialization may be moved to the applications 228. Applications 228 may be created and added to the application store 232 to expand the potential uses of the monitor 100.

Furthermore, applications 228 may be updated within the application store 232 and subsequently updated on the mobile device 204. Updates to the applications 228 may improve or enhance the use of the monitor 202 in the associated activities, may take advantage of new sensors 220 introduced to the mobile device 204, or the like.

Providing multiple applications 228 directed to multiple objectives may allow a user to employ a single environment monitor, such as the monitor 202, for use in multiple activities, situations, and utilities. By installing new applications 228, the monitor 202 may be used for new activities. Advantageously, the user may use the monitor 202 for multiple activities that may have conventionally required multiple specialized environment monitors.

Applications 228 may be used to aggregate environment information from multiple monitors 202 at a single mobile device 204. For example, the mobile device 204 may form a wireless interface 218 with multiple monitors 202. In some embodiments, applications 228 may be used to aggregate environment information from multiple monitor 202 and mobile device 204 pairs. For example, a computing device connected to the network 206 may aggregate environment information from a number of monitor 202 and mobile device 204 pairs.

Advantageously, an application 228 may allow customization for particular uses. For example, an application 228 designed for ballistics may be customized to include information about a particular firearm, target distance, target elevation, and/or ammunition being used in a target shooting session. The customized information may allow the application 228 to return—via the display 224—non-environmental information such as a particular recommended sight adjustment for the firearm based on detected environmental information such as wind speed, wind direction, air density, and the like.

Other applications may be analogously customized. Typically, customizable applications may be designed for activities that a user may desire non-environmental information based on effects caused by environmental conditions. By way of example and not of limitation, customizable applications may be employed in construction, aviation, sailing, racing, sports, and the like.

While not shown, the outer housing of the monitor 202 can be adapted to removably couple with the mobile device 204. Accordingly, the monitor 202 and mobile device 204 can be coupled when in operation together by the housings thereof being engaged. For example, the monitor 202 and mobile device 204 can include cooperative fasteners. In another example, the monitor 202 can include a receptacle configured as a holder or case for the mobile device 204, which can allow for a touch screen on the mobile device to be operable with a thumb while operating or holding the outer housing of the monitor 202 supporting the mobile device, which such receptacles are well known in the art of mobile device cases and protectors.

Figure 3:
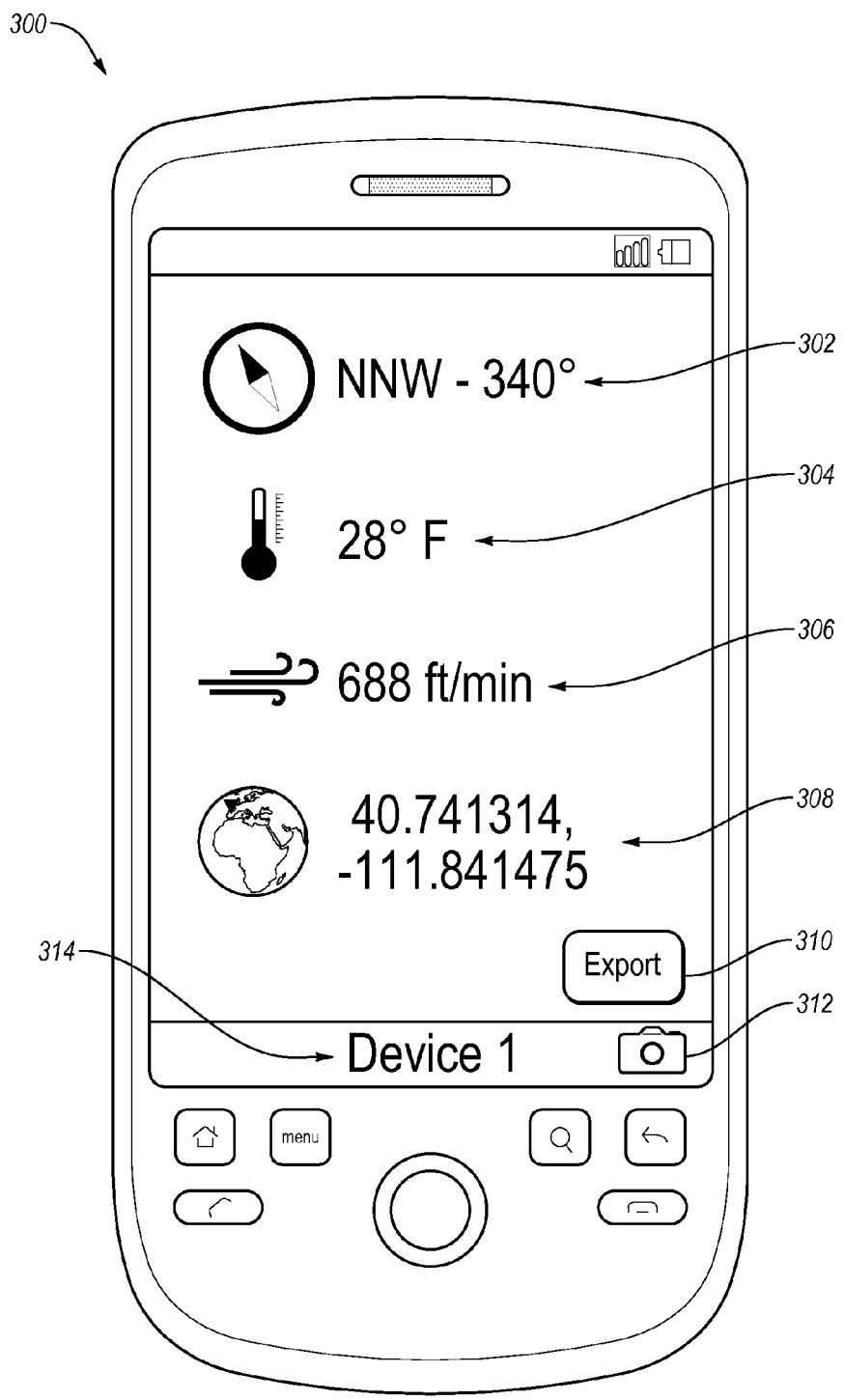
FIG. 3 is a diagrammatic depiction of a mobile device that may be used in the environment monitoring system of FIG. 2.

FIG. 3 is a diagrammatic depiction of a mobile device 300 that may be used in the environment monitoring system 200. The mobile device 300 may generally correspond to the mobile device 204 of FIG. 2. In some embodiments, the mobile device 300 may form a wireless communication interface with an environment monitor generally corresponding to the environment monitor 100 shown in FIG. 1. A name 314 of the connected environment monitor may be displayed by the mobile device 300.

The mobile device 300 may execute an application that causes the mobile device 300 to display environment information. The application may generally correspond to the applications 228 described with reference to FIG. 2. The environment information may be received generally from the environment monitor. However, in some embodiments, some of the information may be received from sensors of the mobile device 300.

The mobile device 300 may display a direction 302 of the environment monitor and/or the mobile device 300. The mobile device 300 may also display a temperature 304. The temperature 304 may reflect dry bulb temperature, wet bulb temperature, dew point temperature, perceived temperature, or other temperature. In some embodiments, the color of the temperature 304 display may change according to the temperature 304. For example, the temperature 304 may be displayed as blue when the temperature 304 is relatively cold, green when the temperature 304 is relatively comfortable, and red when the temperature is relatively warm.

The mobile device 300 may display a wind speed 306. The wind speed 306 may generally be detected by a wind sensor 106 as described with reference to FIGS. 1A-1D. The mobile device 300 may also display a geographic location 308 of the mobile device 300 and/or the environment monitor. Preferably, a GPS sensor of the mobile device 300 is used. In some embodiments, selecting the geographic location 308, such as through selecting the geographic location 308 via a touch-screen display, may prompt the mobile device 300 to display a local map of the geographic location 308.

The mobile device 300 may further allow environment information collected over time to be exported to a storage, a network, or the like via an export 310. In some embodiments, the application may allow a camera 312 of the mobile device 300 to capture a video and/or photo associated with the environment conditions at the time the video and/or photo is captured.

The mobile device 300 illustrates an example display including particular environment information. Other displays may be used, including displays directed toward particular applications, activities, situations, and/or utilities. The displays may provide more or less environment information, and/or other information based on the detected environment information.

The embodiments described herein may include the use of a special purpose or general purpose computer including various computer hardware or software modules, as discussed in greater detail below.

In one embodiment, the monitor can be operated to obtain environment data by holding the outer housing with the inner housing extended therefrom so that the hand holding the outer housing does not circumnavigate any portion of the inner housing. In one aspect, the monitor can be held over the head of the user so that the body of the user does not interfere with the sensors. In another aspect, the monitor can be held substantially vertical, where, optionally, sensors can provide an indication of being vertical or not to assist in holding and maintaining the vertical position. In one aspect, the monitor can be held out to the side of the user so that the body of the user does not interfere with data acquisition. In one aspect, the monitor and mobile device can be held in the same hand. In one aspect, the monitor and mobile device can be held in different hands. In one aspect, the mobile device can be held in one hand so that a screen thereof can be viewed and the monitor can be held in the other hand away from the body. Any of these methodologies can be used separately or in combination.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include tangible computer-readable storage media including random-access memory (RAM), read-only memory (ROM), electrically erasable programmable read-only memory (EEPROM), compact disc read-only memory (CD-ROM) or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions include, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An environment monitor comprising:
   an outer housing;
   an inner housing slidingly positioned relative the outer housing, the inner housing configured to be selectively positioned at a first position relative to the outer housing and selectively positioned at a different second position relative to the outer housing; and
   an environment sensor configured to monitor a characteristic of an environment proximate the sensor, the sensor positioned on the inner housing such that:
      the environment sensor is at least partially positioned within the outer housing when the inner housing is at the first position relative to the outer housing, and
      the environment sensor is positioned outside the outer housing when the inner housing is at the second position relative to the outer housing.

2. The environment monitor of claim 1, further comprising an antenna configured to form a wireless interface with a mobile device, the environment monitor configured to transmit environment information from the environment sensor to the mobile device.

3. The environment monitor of claim 2, the wireless interface including a Bluetooth wireless interface or an IEEE 802.11 wireless interface.

4. The environment monitor of claim 1, further comprising a display configured to display characteristics about the environment detected from the environment sensor or calculated by the environment monitor.

5. The environment monitor of claim 1, the inner housing including a protrusion, at least a portion of the protrusion positioned outside the outer housing when the inner housing is in the first relative position and when the inner housing is in the second relative position.

6. The environment monitor of claim 5, the protrusion configured to allow a user of the environment monitor to move the inner housing from the first position relative to the outer housing to the second position relative to the outer housing a single hand.

7. The environment monitor of claim 1, the environment sensor including a temperature-sensing device.

8. The environment monitor of claim 1, the environment sensor including a wind-speed-sensing device.

9. The environment monitor of claim 1, the outer housing including a first threaded connector configured to allow the environment monitor to be selectively secured via a second threaded connector.

10. The environment monitor of claim 1, further comprising a position sensor configured to:
    turn the device on when the inner housing is located in the second position relative to the outer housing, and
    turn the device off when the inner housing is located in the first position relative to the outer housing.

11. An environment monitor comprising:
    an outer housing;
    an inner housing positioned at least partially within the outer housing; and
    a plurality of environment sensors positioned within the inner housing, the plurality of environment sensors configured to monitor the environment proximate the plurality of environment sensors when the environment sensors are positioned outside the outer housing,
    the inner housing slidingly movable between a first position and a different second position, both relative to the outer housing, the inner housing and the outer housing configured such that:
       the plurality of environment sensors are positioned within the outer housing when the inner housing is located in the first position relative to the outer housing, and
       the plurality of environment sensors are positioned outside the outer housing when the inner housing is located in the second position relative to the outer housing.

12. The environment monitor of claim 11, further comprising an antenna configured to form a wireless interface with a mobile device, the environment monitor configured to transmit environment information from the environment sensor to the mobile device.

13. The environment monitor of claim 12, the wireless interface including a Bluetooth wireless interface or an IEEE 802.11 wireless interface.

14. The environment monitor of claim 11, further comprising a display configured to display environment information from the environment sensor.

15. The environment monitor of claim 11, the inner housing including a protrusion, at least a portion of the protrusion positioned outside the outer housing when the inner housing is in the first relative position and when the inner housing is in the second relative position.

16. The environment monitor of claim 15, the protrusion configured to allow a user of the environment monitor to move the inner housing from the first position relative to the outer housing to the second position relative to the outer housing a single hand.

17. The environment monitor of claim 11, the environment sensor including a wind-speed-sensing device.

18. The environment monitor of claim 11, the outer housing including a first threaded connector configured to allow the environment monitor to be selectively secured via a second threaded connector.

19. A device for monitoring an environment proximate the device, the device comprising:
    an outer housing;
    an inner housing including a protrusion extending outside of the outer housing;
    a plurality of environment sensors positioned on the inner housing, the plurality of environment sensors configured to monitor the environment proximate the plurality of environment sensors when the environment sensors are positioned outside the outer housing; and
    an antenna configured to form a wireless interface with a mobile device, the antenna configured to transmit environment data from the plurality of environment sensors to the mobile device,
    the inner housing configured to interface with the outer housing such that the inner housing is slidingly movable between a first position and a different second position relative to the outer housing by way of a force applied to the protrusion relative to the outer housing, the inner housing and the outer housing configured such that:
       the plurality of environment sensors are positioned within the outer housing when the inner housing is located in the first position relative to the outer housing, and the plurality of environment sensors are positioned outside the outer housing when the inner housing is located in the second position relative to the outer housing.

20. The device of claim 19, further comprising a position sensor configured to:
   turn the device on when the inner housing is located in the second position relative to the outer housing, and
   turn the device off when the inner housing is located in the first position relative to the outer housing.

* * * * *